(12) United States Patent
Roos

(10) Patent No.: US 10,191,896 B2
(45) Date of Patent: *Jan. 29, 2019

(54) POPULATING USER DATA

(71) Applicant: Skype, Dublin (IE)

(72) Inventor: Martin Roos, Tartu (EE)

(73) Assignee: SKYPE, Dublin (IE)

( * ) Notice: Subject to any disclaimer, the term of this patent is extended or adjusted under 35 U.S.C. 154(b) by 47 days.

This patent is subject to a terminal disclaimer.

(21) Appl. No.: 15/250,028

(22) Filed: Aug. 29, 2016

(65) Prior Publication Data

US 2017/0132193 A1 May 11, 2017

Related U.S. Application Data

(63) Continuation of application No. 13/327,297, filed on Dec. 15, 2011, now Pat. No. 9,451,408.

(30) Foreign Application Priority Data

Oct. 10, 2011 (GB) .................................. 1117441.4

(51) Int. Cl.
*G06F 17/24* (2006.01)
*H04M 1/725* (2006.01)
(Continued)

(52) U.S. Cl.
CPC ........... *G06F 17/243* (2013.01); *G06Q 30/04* (2013.01); *H04M 1/72561* (2013.01);
(Continued)

(58) Field of Classification Search
CPC .. G06F 17/243; G06Q 30/04; H04M 1/72561; H04W 4/025
See application file for complete search history.

(56) References Cited

U.S. PATENT DOCUMENTS 6,088,594 A * 7/2000 Kingdon ............... G01S 5/0054
340/995.1
6,651,217 B1 11/2003 Kennedy et al.
(Continued)

FOREIGN PATENT DOCUMENTS

CN 1650649 8/2005

OTHER PUBLICATIONS

"Final Office Action", U.S. Appl. No. 13/327,297, dated Dec. 2, 2015, 9 pages.
(Continued)

*Primary Examiner* — Ajit Patel
(74) *Attorney, Agent, or Firm* — Schwegman Lundberg & Woessner, P.A.

(57) ABSTRACT

A computer system for receiving user data comprising a user access component having a display and a processor arranged to execute a data receiving application, wherein the data receiving application provides on the display at least one address field; and a geographical location device in communication with a location network and arranged to identify a geographical location of the device using information from the location network, the geographical location device located at a user address, the geographical location device operable to provide location data from which address data of the user address is derived and supplied to the data receiving application to automatically populate the address field on the display.

20 Claims, 3 Drawing Sheets

(51) Int. Cl.
    *H04W 4/02* (2018.01)
    *H04W 4/20* (2018.01)
    *G06Q 30/04* (2012.01)

(52) U.S. Cl.
    CPC ........... *H04W 4/025* (2013.01); *H04W 4/026* (2013.01); *H04W 4/20* (2013.01)

(56) References Cited

U.S. PATENT DOCUMENTS

| | | | |
|---|---|---|---|
| 6,910,179 | B1 | 6/2005 | Pennell et al. |
| 7,020,494 | B2* | 3/2006 | Spriestersbach ....... G06Q 10/10 455/456.1 |
| 7,283,846 | B2 | 10/2007 | Spriestersbach et al. |
| 9,451,408 | B2 | 9/2016 | Roos |
| 2004/0068693 | A1 | 4/2004 | Rawat et al. |
| 2007/0064264 | A1* | 3/2007 | Silverbrook ............. B41J 3/445 358/1.15 |
| 2007/0156977 | A1 | 7/2007 | Ritter et al. |
| 2008/0134088 | A1* | 6/2008 | Tse ................... G06F 17/30241 715/810 |
| 2008/0172598 | A1 | 7/2008 | Jacobsen et al. |
| 2009/0028179 | A1 | 1/2009 | Albal |
| 2009/0112457 | A1 | 4/2009 | Sanchez et al. |
| 2009/0282345 | A1 | 11/2009 | Smith et al. |
| 2009/0325603 | A1* | 12/2009 | Van Os ................... H04W 4/02 455/456.2 |
| 2011/0320293 | A1 | 12/2011 | Khan |
| 2012/0022896 | A1 | 1/2012 | Jayaram et al. |
| 2012/0124059 | A1 | 5/2012 | Pratt et al. |
| 2013/0004014 | A1 | 1/2013 | Hickman |
| 2013/0090135 | A1 | 4/2013 | Ross |

OTHER PUBLICATIONS

"Foreign Office Action", CN Application No. 201210381807.5, dated Apr. 1, 2016, 16 pages.

"Foreign Office Action", CN Application No. 201210381807.5, dated May 6, 2015, 15 pages.

"Non-Final Office Action", U.S. Appl. No. 13/327,297, dated Jun. 18, 2015, 7 pages.

"Notice of Allowance", U.S. Appl. No. 13/327,297, dated May 20, 2016, 12 pages.

"Fourth Office Action Issued in Chinese Patent Application No. 201210381807.5", dated Mar. 24, 2017, 19 Pages.

"Third Office Action Issued in Chinese Patent Application No. 201210381807.5", dated Oct. 24, 2016, 17 Pages.

"Office Action Issued in Chinese Patent Application No. 201210381807.5", dated Aug. 9, 2018, 11 Pages.

* cited by examiner

POPULATING USER DATA

RELATED APPLICATIONS

This application is a continuation of U.S. patent application Ser. No. 13/327,297, entitled "Populating User Data" and filed Dec. 15, 2011. U.S. patent application Ser. No. 13/327,297 claims priority under 35 U.S.C. § 119 or 365 to Great Britain, Application No. GB1117441.4, filed Oct. 10, 2011. The entire teachings of the above applications are incorporated herein by reference.

TECHNICAL FIELD

The present invention relates to populating user data in a computer system.

BACKGROUND

User terminals in a computer system are often connected in a communication network to provide them with access to a wide range of services. In particular, a user terminal can execute a web browser for accessing the public Internet for calling up websites associated with particular services which are provided by a host server, also connected to the Internet. In order to access a service provided by a host server, a user at the user terminal has to provide user data which will be supplied to the host server via the communication network (e.g. Internet) and in return for which a service can be accessed. In order to prompt a user to enter data, the web browser can launch a page with a series of fields into which a user is expected to enter certain user data, such as user name, log-in details, etc. In particular, a type of data which is often required to permit on-line transactions in address data. For security reasons, this data is usually not stored at the host server or user terminal. Therefore such data has to be re-entered each time a user wishes to perform the on-line transaction. A user can enter this data using a user interface such as a mouse/cursor or keyboard or any other suitable interface (for example, a touch screen).

Postcode mapping services exist such that if the user terminal or website is connected to such a service, the user can enter a postcode and a series of alternative addresses is displayed to the user in association with the address field so that a user can select the correct address to populate the address field by clicking on the correct displayed address. This reduces the amount of data that has to be entered by a user into the address field.

Even so, entering addresses on mobile devices with touchscreens or numeric keypads is extremely annoying, and some people can make mistakes while entering them.

It is an aim of the invention to increase the facility with which a user can accurately and efficiently populate an address field.

SUMMARY

According to the present invention, there is provided a computer system for receiving user data comprising:
a user access component having a display and a processor arranged to execute a data receiving application, wherein the data receiving application provides on the display at least one address field; and
a geographical location device in communication with a location network and arranged to identify a geographical location of the device using information from the location network, the geographical location device located at a user address, the geographical location device operable to provide location data from which address data of the user address is derived and supplied to the data receiving application to automatically populate the address field on the display.

The invention also provides a method of supplying address data to a data store in a computer system, the method comprising:
executing on a processor of the computer system a data receiving application which provides an address data field on a display for a user;
notifying a geographical location device to identify a location of the computer system using information form a location network and to supply to the data store address data to the data store derived from the geographical location data; and
the data receiving application retrieving address data from the data store and automatically populating the address field with said address data.

The invention also provides a computer program product which when executed by a computer implements the foregoing method.

The invention is particularly useful in the context of on-line billing where a user is carrying out mobile payments by allowing billing address data for payment procedures to be completed by using a geographical location device which exists on their mobile device. This is, the computer system preferably comprises a unitary mobile device which provides a user access component and a geographical location device in a single housing which can be carried around by a user.

The geographical location device can comprise a GPS/AGPS navigation system or can rely on mobile cellular network location systems.

A geographical location device operates by providing location coordinates identifying the geographical location of the device. The computer system can be connected to an external address service via data connection which use the location coordinates to provide a precise address for that geographical location.

Such an external address service could use the databases and search facilities in existing navigation systems, where an address is input to provide a geographical location, the search being done "in reverse".

GPS/AGPS systems operate by transmitting wireless signals to a satellite network and receiving responses from which a location of the device can be identified by a look-up procedure which can take a period of time, perhaps 1 or 2 seconds.

It is advantageous if the geographical location device can initialize its look-up procedure in advance, so that necessary address information can be available for the moment it is required at the user terminal. This can be accomplished by initializing the look-up procedure if it is known that a user address will be required within a flow which has commenced at the user terminal. To achieve this, the data receiving application can issued a notification to the geographical location device at commencement of a data entry flow which will require a user address.

For a better understanding of the present invention and to show how the same can be carried into effect, reference will now be made by way of example, to the drawings.

DETAILED DESCRIPTION

Figure 1:
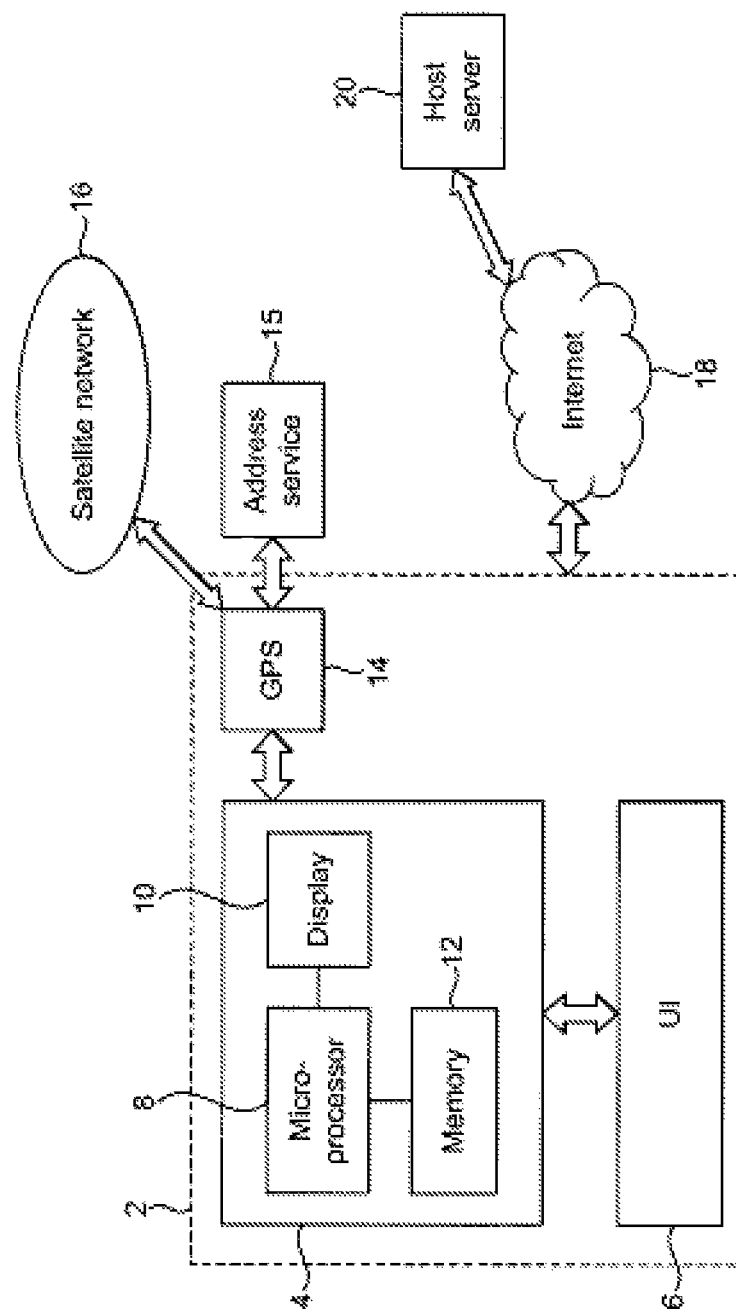
FIG. 1 is a schematic block diagram of a communication system.

With reference to FIG. 1, the computer system 2 comprises a user access component 4 connected to a user interface 6. The user access component comprises a processor 8, a display 10 and a memory 12. The computer system also comprises a geographical location device which in the described embodiment comprises a geographical positioning system (GPS). In a particularly preferred embodiment, the computer system is a single user terminal, for example, a unitary mobile device where the components are housed in a single housing. Therefore, the GPS 14 operates to provide a location of the mobile device. As is known, a GPS navigation system operates to provide location data of its location using a satellite network which is indicated diagrammatically by reference numeral 16. The operation of a GPS is assumed to be known and so is not described further herein.

FIG. 1 shows the computer system 2 connected to a communication network such as the Internet 18. A host server 20 accessible by the user terminal 2 allows the user at the user terminal 2 to access services through the Internet.

Figure 2:
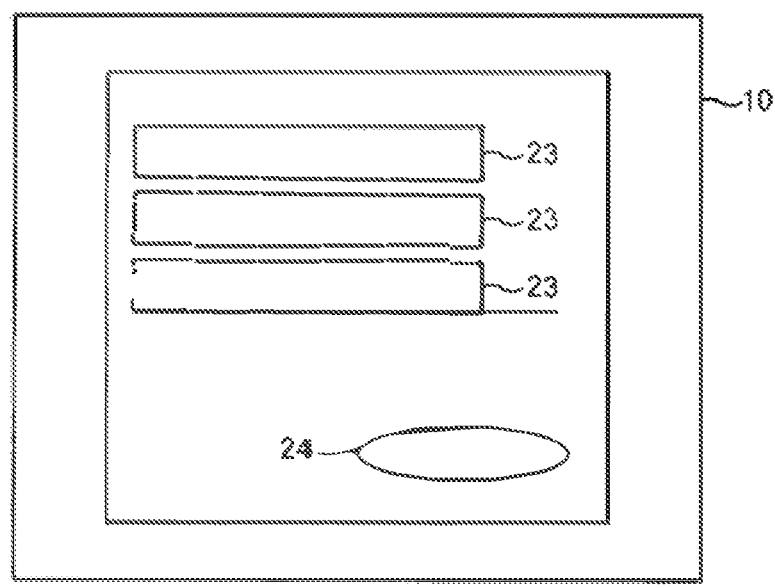
FIGS. 2 and 3 show example screens in an on-line flow.
Figure 3:
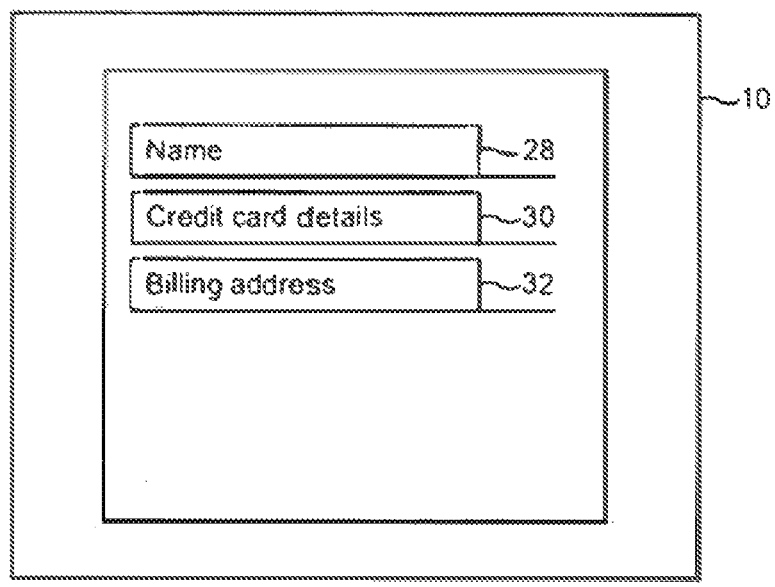

To access a service, a user at the user terminal 2 enters user data using the user interface 6 into a page launched on the display 10 by a web browser executed on the processor 8. The user data is communicated to the host server 20 via the Internet 18 and in this way, a service at the host server 20 can be accessed. One particular, type of service which occurs frequently is an on-line billing service. In order to effect an on-line purchase, a user may be presented with a series of pages for the website from which it wishes to purchase goods or services, and by means of which a user can select a series of goods or services to be purchases. When a user has reached a point that he has decided to purchase one or more goods or services, he may be presented with a screen such as shown in FIG. 2 which illustrates a series of items which have been selected for purchase and a button 24 which the user can actuate for example, by clicking (or touching on a touch screen) to commence purchase. At this stage, a data receiving application executed by the processor 8 can recognize that on-line billing is about to commence and can issue a notification to the GPS 14 to initialize its look-up procedure. At this stage, a billing page is launched for a user on the display 10 as shown in FIG. 3. The billing page 26 comprises a series of fields, including for example, a field for a user name 28, a field for credit card or debit card details, expiry date, etc., 30 and an address field 32 for receiving a billing address.

In accordance with an embodiment of the present invention, the address field 32 is automatically populated by address data based on location data received from the GPS 14 after it has conducted its look-up and provided location data identifying a geographical location of the device using information from the satellite network 16. It will be appreciated that localizing data from a GPS takes the form of map coordinates, e.g. 28° N 3° E, rather than a postal address. A conversion needs to be made, which can be done by the GPS 14, the processor 8 or by an address service 15.

Many existing mobile devices which operate as user terminals already have an board a quick but inexact location system which operates in addition to the GPS. In such a case, the address field should be populated with data from the "rough and ready" location system, while the GPS searches for a response signal from its satellite network in order to provide location data from which an address can be identified and used to populate the address field more accurately.

To this end, an address service (identified in FIG. 1 by reference numeral 15) can be connected to the GPS 14 via a data connection and used to supply an accurate address for the location coordinates acquired by the GPS 14. The GPS 14 on the device can supply coordinate data, to be turned into a "real" address by the address service 15. Service 15 has the mappings between an address and some location, similarly to a service like Google™ Maps which translates an address into a geographical location, but used in reverse to supply an address from location coordinates.

The address data is supplied to the memory 12 which acts as a data store from where the data receiving application can retrieve it.

In any event, the resulting address is suggested to the user as the billing address and/or delivery address by presenting it to the user in the address field on the display 10. The user can confirm the address is accurate via the user interface, for example by clicking on it to select it. Alternatively, the user can correct the captured address in case the details are not precise enough or are inaccurate.

The billing address can be used for the purchase after the user has confirmed it. In the case that the purchase service provider does not provide reusability of billing data (which is often the case for security reasons), the user terminal may cache it be linking it to the location coordinates acquired by the GPS device. That is, the address can be stored at the device in a cache with the location coordinates so next time the location coordinates are acquired the same address is provided.

Figure 4:
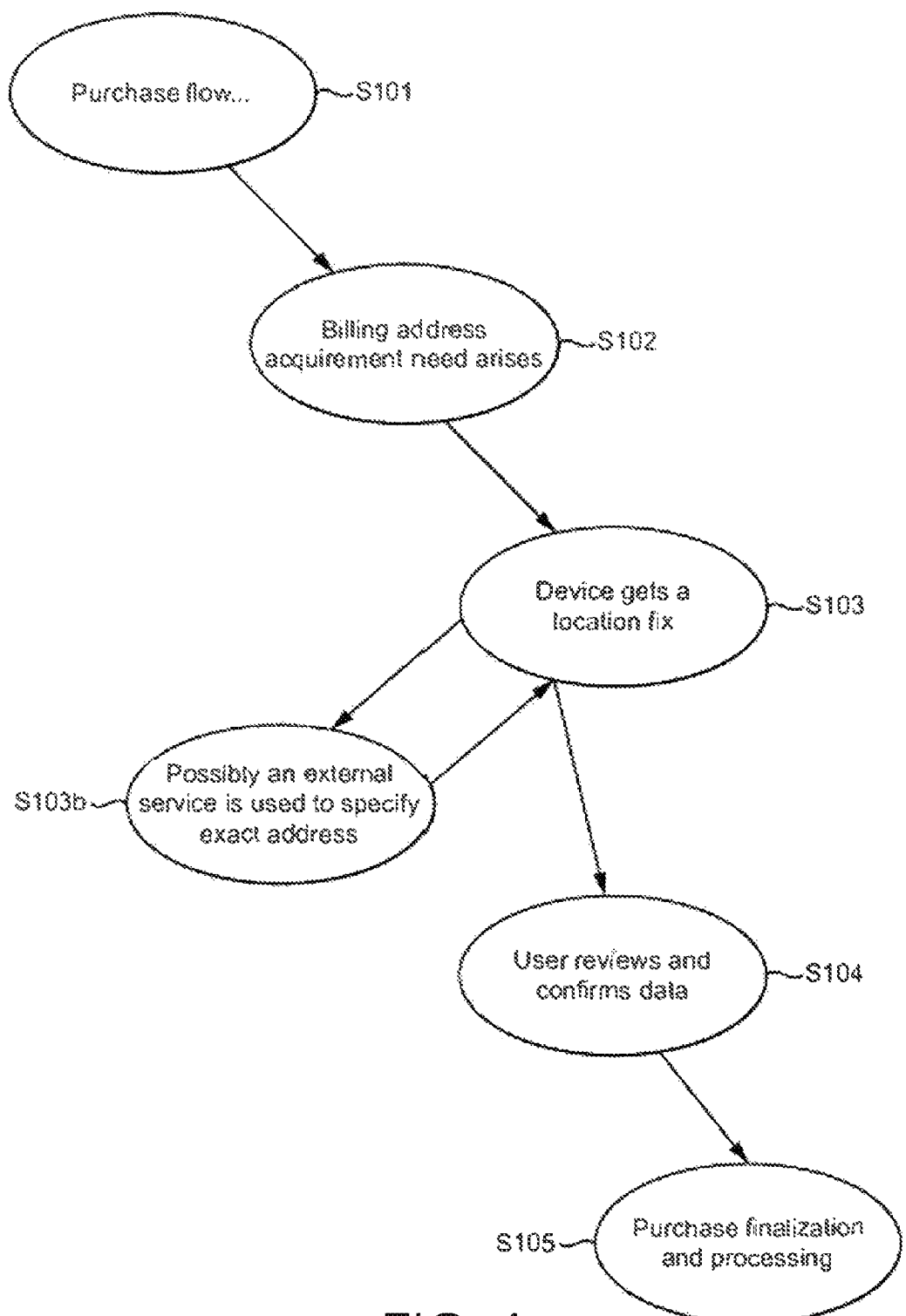
FIG. 4 is a flow diagram.

FIG. 4 is a schematic diagram of a simplified user flow to implement an embodiment of the invention. According to step 101, a purchase flow is commenced by a user. According to step 102, a billing address acquirement need arises and this is notified to the GPS device 14. In step 103, the GPS device gets a location fix and provides location data to an address service 15 as indicated in step 103b. An exact address is returned to the user terminal and is displayed to a user in the address field 32, whereby at step 104 a user reviews and confirms the data. At step 105, a user can finalize the purchase.

The invention can be implemented by any suitable combination of hardware and software. The data receiving application is embodied as a computer program executable on the processor and can be responsible for implementing a purchase flow or can be component associated with a purchase flow or other on-line service acquisition flow. The data receiving application can be stored in the memory 12.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

While this invention has been particularly shown and described with reference to example embodiments thereof, it will be understood by those skilled in the art that various changes in form and details may be made therein without departing from the scope of the invention encompassed by the appended claims.

What is claimed is:

1. A computer system for receiving user data comprising:
a user terminal having a processor arranged to execute a data receiving application, wherein the data receiving application provides at least one street address field for a transaction, and wherein the user terminal is configured to:
receive user input to commence the transaction; and
issue, responsive to the user input, a notification that a street address for the transaction is required; and
a geographical location device in communication with a location network and arranged to receive the notification, and to identify a geographical location of the user terminal using information from the location network, the geographical location device operable to provide location data from which street address data of a user address is derived and supplied to the data receiving application to automatically communicate the street address data to the data receiving application for populating to the street address field for the transaction.

2. A computer system according to claim 1, wherein the user terminal comprises a unitary mobile terminal.

3. A computer system according to claim 1, wherein the geographic location device is operable to communicate with a geographical positioning system over the location network to obtain the geographical location of the user terminal.

4. A computer system according to claim 1, further comprising a data connection for supplying the location data from the geographical location device to an address service which uses the location data to provide said address data for populating the address field.

5. A computer system according to claim 1, wherein the data receiving application is operable to issue a notification to the geographical location device at commencement of a data entry flow which requires a user address.

6. A computer system according to claim 1, wherein the user terminal is further configured to:
detect user input confirming the street address data populated to the street address field; and
cause, responsive to the user input, the street address data to be used to proceed with the transaction.

7. A computer system according to claim 1, wherein the user terminal is further configured to:
detect user input confirming the street address data by selecting the street address data populated to the street address field; and
cause, responsive to the user input, the street address data to be used to proceed with the transaction.

8. A computer system according to claim 1, wherein the geographical location device is configured to:
determine, prior to identifying the geographical location of the user terminal from the location network, an approximate location of the user terminal;
provide the approximate location of the user terminal to the data receiving application for populating to the street address field; and
communicate the street address data to the data receiving application to be used to replace the approximate location of the user terminal in the street address field for the transaction.

9. A computer system according to claim 1, wherein the geographical location device is configured to:
determine, prior to identifying the geographical location of the user terminal from the location network, an approximate location of the user terminal using local functionality of the user terminal;
provide the approximate location of the user terminal to the data receiving application for populating to the street address field; and
communicate the street address data to the data receiving application to be used to replace the approximate location of the user terminal in the street address field for the transaction.

10. A computer system according to claim 1, wherein the geographical location device is configured to cache the street address data in association with the geographical location of the user terminal, the cached street address data being usable for a subsequent transaction.

11. A method comprising:
presenting, via an application on a user terminal, a user interface including a street address field that is usable as part of a transaction implemented via the application;
receiving user input to the user interface to commence the transaction;
issuing, responsive to the user input, a notification that a street address for the transaction is required;
identifying, responsive to the notification, a geographical location of the user terminal using information from a location network;
using to geographical location to ascertain street address data that corresponds to the geographical location of the user terminal; and
communicating the street address data to the application for populating to the street address field for the transaction.

12. A method as recited in claim 11, further comprising:
detecting further user input confirming the street address data populated to the street address field; and
causing, responsive to the further user input, the street address data to be used to proceed with the transaction.

13. A method as recited in claim 11, further comprising:
detecting further user input to the street address field confirming the street address data populated to the street address field; and
cause, responsive to the user input, the street address data to be used to proceed with the transaction.

14. A method as recited in claim 11, further comprising:
determining, prior to identifying the geographical location of the user terminal from the location network, an approximate location of the user terminal;
providing the approximate location of the user terminal to the application for populating to the street address field; and
communicating the street address data to the application to be used to replace the approximate location of the user terminal in the street address field for the transaction.

15. A method as recited in claim 11, further comprising:
determining, prior to identifying the geographical location of the user terminal from the location network, an approximate location of the user terminal using local functionality of the user terminal;

providing the approximate location of the user terminal to the application for populating to the street address field; and communicating the street address data to the application to be used to replace the approximate location of the user terminal in the street address field for the transaction.

16. One or more memories storing instructions that are executable to perform operations comprising:

presenting, via an application on a user terminal, a user interface including a street address field that is usable as part of a transaction implemented via the application;

receiving user input to the user interface to commence the transaction;

issuing, responsive to the user input, a notification that a street address for the transaction is required;

identifying, responsive to the notification, a geographical location of the user terminal using information from a location network;

using to geographical location to ascertain street address data that corresponds to the geographical location of the user terminal; and communicating the street address data to the application for populating to the street address field for the transaction.

17. One or more memories as recited in claim 16, wherein the operations further comprise:

detecting further user input confirming the street address data populated to the street address field; and causing, responsive to the further user input, the street address data to be used to proceed with the transaction.

18. One or more memories as recited in claim 16, wherein the operations further comprise:

detecting further user input to the street address field confirming the street address data populated to the street address field; and cause, responsive to the user input, the street address data to be used to proceed with the transaction.

19. One or more memories as recited in claim 16, wherein the operations further comprise:

determining, prior to identifying the geographical location of the user terminal from the location network, an approximate location of the user terminal;

providing the approximate location of the user terminal to the application for populating to the street address field; and communicating the street address data to the application to be used to replace the approximate location of the user terminal in the street address field for the transaction.

20. One or more memories as recited in claim 16, wherein the operations further comprise:

determining, prior to identifying the geographical location of the user terminal from the location network, an approximate location of the user terminal using local functionality of the user terminal;

providing the approximate location of the user terminal to the application for populating to the street address field; and communicating the street address data to the application to be used to replace the approximate location of the user terminal in the street address field for the transaction.

* * * * *